(12) United States Patent
Adams

(10) Patent No.: US 7,396,396 B2
(45) Date of Patent: Jul. 8, 2008

(54) EMULSION INK

(75) Inventor: John Christopher Adams, Clackmannanshire (GB)

(73) Assignees: GR Advanced Materials Ltd., Stirling (GB); Tohoku Ricoh Co., Ltd., Nakanomyo, Shibata-Machi, Shibata-Gun, Miyagi (JP)

( * ) Notice: Subject to any disclaimer, the term of this patent is extended or adjusted under 35 U.S.C. 154(b) by 278 days.

(21) Appl. No.: 10/985,368

(22) Filed: Nov. 10, 2004

(65) Prior Publication Data

US 2006/0036000 A1 Feb. 16, 2006

(30) Foreign Application Priority Data

Nov. 10, 2003 (GB) ................................. 0326198.9
Nov. 5, 2004 (GB) ................................. 0424502.3

(51) Int. Cl.
*C09D 11/00* (2006.01)
(52) U.S. Cl. .................... 106/31.26; 523/160; 523/161
(58) Field of Classification Search ............. 106/31.26, 106/31.9; 523/160, 161
See application file for complete search history.

(56) References Cited

U.S. PATENT DOCUMENTS

| 3,279,935 | A | * | 10/1966 | Daniell et al. ............... 106/478 |
| 3,717,494 | A | * | 2/1973 | Jager et al. .................. 106/474 |
| 3,992,218 | A | * | 11/1976 | Suetsugu et al. ............. 106/478 |
| 4,203,877 | A | | 5/1980 | Baker |
| 4,918,123 | A | | 4/1990 | Yang et al. |
| 5,226,957 | A | | 7/1993 | Wickramanayake et al. |
| 5,395,435 | A | * | 3/1995 | Mizobuchi ............... 106/31.26 |
| 5,573,578 | A | | 11/1996 | Okuda |
| 5,622,548 | A | | 4/1997 | Zou et al. |
| 5,718,747 | A | * | 2/1998 | Okusawa ................. 106/31.26 |
| 5,738,715 | A | * | 4/1998 | Okuda et al. ............. 106/31.26 |
| 5,779,777 | A | | 7/1998 | Okuda et al. |
| 5,853,466 | A | | 12/1998 | Matsuura et al. |
| 5,880,214 | A | | 3/1999 | Okuda |
| 5,902,388 | A | | 5/1999 | Matsuura et al. |
| 5,948,151 | A | * | 9/1999 | Ono et al. ................. 106/31.26 |
| 6,149,720 | A | * | 11/2000 | Asada et al. .............. 106/31.26 |
| 6,156,109 | A | * | 12/2000 | Asada ...................... 106/31.26 |
| 6,165,258 | A | * | 12/2000 | Asada ...................... 106/31.26 |
| 6,527,842 | B1 | | 3/2003 | Adams et al. |
| 6,632,272 | B2 | | 10/2003 | Hayashi et al. |
| 6,632,273 | B2 | | 10/2003 | Hayashi et al. |
| 6,699,312 | B2 | | 3/2004 | Hayashi et al. |
| 7,008,474 | B2 | * | 3/2006 | Konno et al. ............. 106/31.26 |
| 7,037,364 | B2 | * | 5/2006 | Hamilton et al. ......... 106/31.26 |
| 2002/0124770 | A1 | | 9/2002 | Hayashi |
| 2006/0100309 | A1 | * | 5/2006 | Adams et al. ............... 523/160 |

FOREIGN PATENT DOCUMENTS

| DE | 4 202 065 | | 7/1993 |
| EP | 0000424 | | 1/1979 |
| EP | 0623630 | | 11/1994 |
| EP | 0 778 323 | A2 | 6/1997 |
| EP | 0 778 324 | A1 | 6/1997 |
| GB | 2117398 | | 10/1983 |
| GB | 2 354 767 | | 4/2001 |
| GB | 2 408 050 | A | 5/2005 |
| JP | 08/218023 | * | 8/1996 |
| JP | 11001648 | A | 1/1999 |
| WO | WO 96/07689 | | 3/1996 |

OTHER PUBLICATIONS

Derwent abstract of JP08/218023, Aug. 1996.*

* cited by examiner

*Primary Examiner*—Helene Klemanski
(74) *Attorney, Agent, or Firm*—Fish & Richardson P.C.

(57) ABSTRACT

A water-in-oil emulsion ink comprises a water phase and an oil phase, wherein the water phase comprises a carbon black pigment having a pH of less than 8 dispersed therein by a water-soluble resin, and wherein the water phase also comprises a pH-adjusting agent to achieve a pH value for the water phase of 8 or greater. The ink maintains stable rheology on ageing, and provides a stable and consistent ink detection signal even after periods of non-use.

18 Claims, No Drawings

EMULSION INK

FIELD OF THE INVENTION

The present invention relates to water-in-oil emulsion inks for use in the digital duplicator printing process, and in particular to water-in-oil emulsion inks which exhibit stable electrical properties and rheology.

BACKGROUND TO THE INVENTION

Digital duplicator printing is a rotary printing process in which a stencil containing pixel image voids is mounted on the circumference of a printing drum which contains printing ink. The drum circumference is a mesh screen. Sheets of paper are passed under the drum in point contact as it rotates, ink being forced through the screens and stencil on to the paper to make a print.

It is well known to use water-in-oil emulsion inks for this printing process. The inks may contain pigment in the oil or water phase. Inks which contain pigment in the water phase can provide a number of advantages, typically better image density and reduced set-off, in comparison with similar inks containing pigment in the oil phase. Inks having water phase pigmentation are known, for example, from EP-A-704506, EP-A-827992 and EP-A-848046.

EP-A-778323 describes water-in-oil emulsion inks containing carbon black in the water phase. It is claimed that by selecting carbon black with a pH value in the range 6 to 10 it is possible to achieve excellent stability to changes such as drop enlargement and phase separation. Inks undergoing these types of changes become progressively more fluid.

EP-A-846737 describes water-in-oil emulsion inks containing carbon black in the water phase and/or the oil phase, where the pH value of the water phase is adjusted by the addition of base or buffering agent in order to achieve a value in the range 6 to 12, preferably 7 to 9. Again, the benefit claimed is stability to changes which would result in the emulsion becoming progressively more fluid.

SUMMARY OF THE INVENTION

In our investigation of such systems we have found that while it is possible to achieve inks which are resistant to the above-described detrimental changes, it is also possible for these inks to undergo an equally detrimental process of change whereby they become thicker in consistency as they age. This change is evidenced by a significant increase in Theological measures such as yield value and PPP value. PPP is a measurement of the spread of a defined volume of ink between two glass plates (Parallel Plate Plastometer). This method is described by A Voet in American Ink Maker, Volume 28, 1950.

Such changes in rheology can have an adverse effect on the performance of the ink in a digital duplicator. Typical problems include difficulty in pumping the ink from the cartridge in which it is supplied, leading to a high residue of unused ink when the cartridge is discarded and a consequent increase in the cost of printing. There may also be adverse effects on printing properties such as ink consumption and image recovery, which is the number of prints required to achieve full image quality when resuming printing after a period of non-use.

Even when the above-described prior art inks are not subject to the problem of becoming thicker with age, we have found that they give rise to a problem of inconsistency in response to the ink detection systems employed in digital duplicators. These detection systems control the supply of ink to the printing drum to ensure that there is an adequate but not excessive amount present at all times in the printing process. A typical method is to control the volume of ink which is held in a small reservoir formed in the nip between two rollers inside the printing drum by monitoring its capacitance. A detector probe is located in this volume of ink to provide a signal to the ink supply pump. As the ink is depleted through use its capacitance changes, causing a change in output signal from the detector up to a point where a pump is activated to supply more ink to the reservoir until the detector signal confirms that the required ink volume has been restored. Recently, to ensure the most precise control of ink supply to the printing drum, designs have been introduced where, at the start of a new printing run, ink detection commences before the drum starts to rotate. With such machines it has been found that prior art inks containing carbon black in the water phase are inconsistent and unreliable when printing is started after a period of non-use such as a weekend. After a period of rest, it has been found that, unlike inks with pigment in the oil phase, the capacitance properties of the ink change causing a false signal from the ink detector. Generally the capacitance properties of the ink return to their original value as soon as rotation of the printing drum commences. However, an initial incorrect signal from the drum at rest will impair the quality of the initial prints because there is either insufficient or excessive ink inside the print drum. With digital duplicators now being capable of giving full image quality from the first print such defective performance is unacceptable.

It is an objective of the present invention to achieve water-in-oil emulsion inks comprising a dispersion of carbon black in the water phase which maintain stable rheology on ageing. A further objective is to achieve inks which provide a stable and consistent ink detection signal even after standing unused in a digital duplicator drum for a period of days.

According to the present invention, a water-in-oil emulsion ink comprises a water phase and an oil phase, wherein the water phase comprises a carbon black pigment having a pH less than 8 dispersed therein by a water-soluble resin, and wherein the water phase further comprises a pH-adjusting agent to achieve a pH value for the water phase of at least 8.

While not wishing to be bound by theory, it is thought that the use of a pH-adjusting agent is of crucial importance to the achievement of stability of the carbon dispersion within the ink, and also to the achievement of consistent electrical properties for reliable ink detection.

For weakly acid or weakly alkaline carbons (pH 6 to 8), the presence of a pH-adjusting agent to increase the pH of the water phase serves to prevent detrimental changes which lead to large increases in the ink yield and PPP values which are otherwise observed. It is thought that these changes occur because of flocculation of pigment particles within the ink. The incorporation of a pH-adjusting agent to increase the pH of the water phase is thought to achieve stability by causing ionisation of the acid groups on the surface of the carbon pigment to create particles with a net negative charge. As a result, the pigment flocculation process is prevented by the electrostatic repulsion between the like charged pigment particles.

Inks incorporating more strongly acid carbon pigments (pH less than 6) are not prone to the catastrophic processes of increasing structure which occur with weakly acid carbon, presumably because the greater degree of ionisation of the surface acid groups provides sufficient electrostatic stabilisation. However, even inks which incorporate this type of pigment demonstrate more consistent ink detection properties, presumably because of the increased ionisation of the surface acid groups which results from the addition of an alkaline component.

DETAILED DESCRIPTION OF THE INVENTION

Inks according to the prevent invention are water-in-oil emulsions comprising a water phase dispersed within an oil phase.

The water phase comprises a carbon black pigment having a pH of less than 8. In the context of this Application, the pH of the carbon black pigment is determined by measuring the pH of the water phase of the ink in the absence of the pH-adjusting agent at room temperature, typically at 20 to 23° C.

Suitable carbon black pigments are commercially available and are generally categorised on the basis of their manufacturing process, giving rise to types such as furnace black, acetylene black, gas black and the like. However, in order to make inks according to the present invention, it is necessary to have regard to the pH specification of the particular grade of carbon black to be used since the requirements of the present invention cannot always be satisfied simply by selection of a particular type of carbon.

Typically, the carbon black pigment is present in the ink at an average particle size of no more than 10 µm, preferably less than 5 µm, more preferably less than 2 µm, and most preferably less than 1 µm.

The concentration of carbon black pigment within the ink will typically fall within the range 1 to 20% by weight, preferably 2 to 15% by weight, and most preferably 3 to 9% by weight, of the total ink.

The carbon pigment is dispersed within the water phase by a water-soluble resin. Preferred water-soluble resins include non-ionic resins, and the most preferred water-soluble resins are homopolymers and co-polymers of N-vinyl pyrrolidone.

The amount of water-soluble resin included in the ink is typically in the range 0.5 to 30% by weight, preferably 1 to 20% by weight, of the water phase of the ink.

The water phase also comprises a pH-adjusting agent which is capable of increasing the pH of the water phase to a value of 8 or greater. Preferably the pH of the water phase should be increased to a value of 9 or greater. The pH of the water phase is measured at room temperature, typically from 20 to 23° C.

The pH-adjusting agent may or may not have a pH buffer action. Suitable pH-adjusting agents include but are not restricted to inorganic bases such as lithium hydroxide, sodium hydroxide, potassium hydroxide and ammonia; organic bases such as ethanolamine, diethanolamine, triethanolamine, morpholine and diethylaminoethanol; and salts such as trisodium phosphate, borax and sodium carbonate.

Preferably, the water phase is substantially free of surfactant. In the context of the present Application, by substantially free of any surfactant we mean that any surfactant present in the water phase is only present in such a small amount so as not to adversely affect the ink capacitance properties, and therefore the ink detection properties, and so as not to function as a dispersant for the carbon black pigment in the water phase. More preferably, the water phase is totally free of surfactant, including any surfactant that might be incorporated during manufacture of any of the other components of the water phase, such as in an emulsion resin where surfactants are frequently present as emulsifying agents for the precursor monomers. As a consequence, emulsion resins should generally be avoided as components of the water phase.

Again without wishing to be bound by theory, it is believed that the substantial, or total, absence of any surfactant in the water phase may have a beneficial effect on the stability of the emulsion at rest as evidenced by dielectric properties. When a surfactant is present typically the dielectric properties of the ink at rest change with time even at ambient temperatures over a period of a few days. It is thought that this change is the result of a slight increase in the size of the emulsion droplets. Generally the original properties of the ink emulsion are restored by gentle agitation such as would be achieved by rotation of the printing drum on commencement of printing. However, the change in properties of the ink at rest poses a problem for use in digital duplicators which measure ink electrical properties before commencement of printing.

The water phase may optionally comprise other components such as antifreeze agents, fillers, emulsion stabilisers, gellants and biocides.

The water phase typically comprises 20 to 85% by weight, preferably 50 to 80% by weight, of the total ink.

The oil phase comprises an oil or oil blend. The oil may be a paraffinic or naphthenic mineral oil or a synthetic hydrocarbon such as polybutene, a hydrocarbon distillate, silicone oil or a vegetable oil such as rapeseed oil, castor oil, soybean oil and their synthetic derivatives such as soybean oil esters, or any blend thereof.

The oil phase also typically comprises an emulsifying agent. Instead, or additionally, an emulsifying agent may be included in the water phase. The emulsifying agent is any material capable of creating a water-in-oil emulsion in conjunction with the chosen oil and water phase. Typical emulsifying agents, for inclusion in the oil phase, include but are not restricted to sorbitan esters such as sorbitan mono-oleate or sorbitan sesquioleate; lipids such as soya lecithin and polymeric emulsifying agents. The emulsifying agent may be a single emulsifying agent or a blend of different emulsifying agents. In a particular embodiment, a blend of sorbitan ester, such as sorbitan mono-oleate, is used in conjunction with a polymeric emulsifier which is an ABA block copolymer of polyester-polyethylene oxide-polyester prepared by the reaction of 12-hydroxystearic acid with polyethylene oxide.

The oil phase may optionally contain a dissolved resin, fillers, waxes and antioxidants.

The emulsion ink is prepared by combining the water and oil phases using mixing processes known from the prior art.

The present invention is further illustrated by way of reference to the following Examples.

EXAMPLES

Example 1

A weakly acid carbon black pigment was added to an aqueous solution of polyvinyl pyrrolidone and stirred at high speed using a tooth wheel to create a coarse dispersion. The dispersion was milled in a horizontal bead mill containing zirconia grinding media (0.4-0.7 mm) to achieve a maximum particle size of less than 1 µm.

The milled carbon dispersion was combined with a further quantity of water representing 39.7% by weight of the total ink formulation, together with glycerol and biocide solution to make the water phase shown in Table 1, below. In this Table the amounts of the different components are in grams. The biocide was a blend of benzisothiazolinone and octyl isothiazolinone. The pH of the water phase was 6.3.

The pH of the carbon black pigment and the pH of the water phase were measured using a pH meter (Hanna Instruments H1 8424 with VWR probe), after calibration with standard buffer solutions at pH 4 and pH 7.

An oil phase was prepared in accordance with Table 1, by blending a high viscosity naphthenic oil (41-43 cSt at 40° C.) with a low viscosity naphthenic oil (12-14 c5t at 40° C.) together with two emulsifying agents: sorbitan mono-oleate and an ABA polyester-polyethylene oxide-polyester block copolymer prepared by the reaction of 12-hydroxystearic acid and polyethylene oxide.

A water-in-oil emulsion ink was prepared by slow addition of the water phase to the oil phase which was stirred with a tooth wheel stirrer. Stirring was continued after addition of the water phase to ensure that the ink was homogeneous. After standing overnight for approximately 16 hours the ink viscosity and yield value was measured (Casson model) using a Bohlin CS10 rheometer equipped with a 25 mm diameter cone, 2° angle, at 23° C. for a shear stress range of 10.24 to 512 Pa. The PPP value was also measured, at 20 to 23° C. These measurements were repeated at 7 days and 14 days after making the ink. The results are presented in Table 2, below.

Example 2

An ink was made by the method described for Example 1, except that 10% sodium hydroxide solution was added as a pH-adjusting agent to make the water phase in accordance with Table 1. The pH of the water phase was 9.

Comparison of the results in Table 2 for both yield and PPP values for the inks of Examples 1 and 2 confirm that even after one day the ink having a water phase at pH 9 is significantly more mobile than the ink having a water phase at pH 6. Thereafter in a short period of time, the more acid ink undergoes a catastrophic increase in structure to form a very thick paste which is incapable of being pumped by the ink supply pumps used in digital duplicators. By contrast the ink adjusted to pH 9 shows only a moderate increase in structure, where values start to plateau after a period of one week.

Example 3

An ink was prepared by the method of Example 1 in accordance with Table 1, except that the biocide was a blend of methyl isothiazolinone and benzisothiazolinone. The pH of the water phase was 6.4.

Examples 4 to 6

Inks were prepared by the method of Example 3 except that, before emulsification, the pH of the water phase was adjusted according to Table 1 by the addition of sodium hydroxide solution.

In addition to the measurements of ink rheology carried out for previous examples, measurements were also applied to a second sample of each of the inks of Examples 3 to 6 which had been stored at a temperature of 70° C. for 15 days. By an approximation of Arrhenius' Law this is taken to be the equivalent to a storage period of approximately 18 months at room temperature.

The results for the inks of Examples 3 to 6 are also reported in Table 2, and show that, over a period of days at room temperature both PPP and yield values show a significant increase with time where the pH of the water phase is not adjusted (Example 3: pH 6.4). By contrast, the inks with a water phase at pH 8 or greater (Examples 4 to 6) are not subject to these large increases, some decrease being evident at pH 10.

These trends are generally confirmed by the results from the accelerated ageing of the ink samples at 70° C. The inks which retain PPP and yield values closest to the initial results are those having a water phase at pH 9 and 10 (Examples 5 and 6). These inks are capable of retaining stable rheology for a long period of time.

Verification of Ink Detection

To verify the consistency of its ink detection properties, the ink of Example 6 was evaluated in a series of tests on a Priport JP800 digital duplicator (Ricoh Company). As preparation for these tests a series of prints were made to ensure that the printing drum had a full volume of ink, including the ink reservoir at the point of detection. The consistency of ink detection was monitored by use of an oscilloscope which shows two signals: a reference square waveform and the detection signal square waveform. A negative variance between the two signals indicates insufficient ink in the drum and a positive variance indicates excess ink. Experience has shown that inks which are able to maintain a variance of ±3 microseconds or less for the duration of this test are very reliable in the consistency of their detection signal. For this test, the ink signal was monitored at intervals of 24, 48 and 72 hours. A second test was carried out using ink which had been subject to accelerated ageing after 15 days at 70° C. Results to confirm the stability of ink detection for this ink are provided in Table 3, below.

Example 7

An ink was prepared by the method described for Examples 4 to 6, except that sorbitan mono-oleate was used as the only emulsifying agent to achieve the formulation shown in Table 1.

Results for this ink (reported in Table 2) confirm excellent stability where PPP and yield values remain virtually constant for a period equivalent to 18 months at room temperature. This example demonstrates that this formulation does not rely on the polymeric emulsifier of previous examples in order to achieve the claimed benefits of this invention.

TABLE 1

|  | Ink Formation | Example number | | | | | | |
| --- | --- | --- | --- | --- | --- | --- | --- | --- |
|  |  | 1 | 2 | 3 | 4 | 5 | 6 | 7 |
| Water Phase | Carbon | 7.46 | 7.46 | 7.3 | 7.3 | 7.3 | 7.3 | 7.3 |
|  | Polyvinyl pyrrolidone | 3.73 | 3.73 | 3.65 | 3.65 | 3.65 | 3.65 | 3.66 |
|  | Water | 55.33 | 55.33 | 55.75 | 55.75 | 55.75 | 55.75 | 56.74 |
|  | Glycerol | 7 | 7 | 7 | 7 | 7 | 7 | 7 |
|  | Biocide | 0.48 | 0.48 | 0.3 | 0.3 | 0.3 | 0.3 | 0.3 |
|  | Sodium hydroxide | — | To pH 9 | — | To pH 8 | To pH 9 | to pH 10 | to pH 9 |

TABLE 1-continued

|  | Ink Formation | 1 | 2 | 3 | 4 | 5 | 6 | 7 |
|---|---|---|---|---|---|---|---|---|
| Oil Phase | High viscosity naphthenic oil | 5.1 | 5.1 | 14.2 | 14.2 | 14.2 | 14.2 | 12.33 |
|  | Low Viscosity naphthenic oil | 15.1 | 15.1 | 6 | 6 | 6 | 6 | 6.87 |
|  | Polymeric emulsifier | 1.7 | 1.7 | 1.7 | 1.7 | 1.7 | 1.7 | — |
|  | Sorbitan mon-oleate | 4.1 | 4.1 | 4.1 | 4.1 | 4.1 | 4.1 | 5.8 |
|  |  | 100 | 100 | 100 | 100 | 100 | 100 | 100 |

TABLE 2

Results

| Example number | 1 | 2 | 3 | 4 | 5 | 6 | 7 |
|---|---|---|---|---|---|---|---|
| pH of water phase | 6.3 | 9 | 6.4 | 8 | 9 | 10 | 9 |
| PPP value 1 day | 3180 | 1001 | 1840 | 1840 | 1840 | 1840 | 2000 |
| PPP value 7 days | 3180 | 2610 | 1840 | 1840 | 1340 | 1340 | 2000 |
| PPP value 14 days | 6190 | 2610 | 2610 | 1840 | 1450 | 1450 | 2000 |
| PPP value 15 days/70 C. | — | — | 3180 | 3520 | 2180 | 1001 | 2000 |
| Yield value (Pa) 1 day | 179.9 | 74.5 | 93.8 | 89 | 89.1 | 104.6 | 113.8 |
| Yield value (Pa) 7 days | 273 | 171 | 110.9 | 86 | 71.6 | 73.8 | 112.9 |
| Yield value (Pa) 14 days | — | 186 | 115 | 88 | 73 | 72.8 | 113.2 |
| Yield value (Pa) 15 days/70 C. | — | — | 229.7 | 177.7 | 142.2 | 63.9 | 107.3 |

TABLE 3

| | Signal Variance (Microseconds) | |
|---|---|---|
| Test | 1. Unaged Ink | 2. Ink after 15 days/70° C. |
| Result 0 hrs | 0.5 | 0 |
| 24 hrs | 0 | −1 |
| 48 hrs | −1 | −1.5 |
| 72 hrs | −2 | −2.5 |

That which is claimed:

1. A water-in-oil emulsion ink comprising a water phase and an oil phase, wherein the water phase comprises a carbon black pigment having a pH of less than 8 dispersed therein by a water-soluble resin and a pH-adjusting agent to achieve a pH value for the water phase of 8 or greater, and wherein the water phase is substantially free of surfactants and emulsion resins.

2. An ink according to claim 1, wherein the pH of the water phase is 9 or greater.

3. An ink according to claim 2, wherein the water phase is totally free of surfactant.

4. An ink according to claim 2, which further comprises, in the oil phase, an ABA block copolymer prepared from 12-hydroxystearic acid and polyethylene oxide.

5. An ink according to claim 1, wherein the water-soluble resin is a non-ionic resin.

6. An ink according to claim 5, wherein the pH of the water phase is 9 or greater.

7. An ink according to claim 5, wherein the water phase is totally free of surfactant.

8. An ink according to claim 5, which further comprises, in the oil phase, an ABA block copolymer prepared from 12-hydroxystearic acid and polyethylene oxide.

9. An ink according to claim 1, wherein the water-soluble resin is a homopolymer or copolymer of N-vinyl pyrrolidone.

10. An ink according to claim 9, wherein the pH of the water phase is 9 or greater.

11. An ink according to claim 9, wherein the water phase is totally free of surfactant.

12. An ink according to claim 9, which further comprises, in the oil phase, an ABA block copolymer prepared from 12-hydroxystearic acid and polyethylene oxide.

13. An ink according to claim 9, wherein the water-soluble resin is a non-ionic resin.

14. An ink according to claim 1, wherein the water phase is totally free of surfactant.

15. An ink according to claim 14, which further comprises, in the oil phase, an ABA block copolymer prepared from 12-hydroxystearic acid and polyethylene oxide.

16. An ink according to claim 1, which further comprises, in the oil phase, an ABA block copolymer prepared from 12-hydroxystearic acid and polyethylene oxide.

17. An ink according to claim 1, wherein the pH of the water phase is greater than 8.

18. An ink according to claim 1, wherein the water phase is totally free of emulsion resins.

* * * * *